Nov. 27, 1956  J. B. COX  2,771,919
CHAIN SAWS
Original Filed July 1, 1946  3 Sheets-Sheet 2
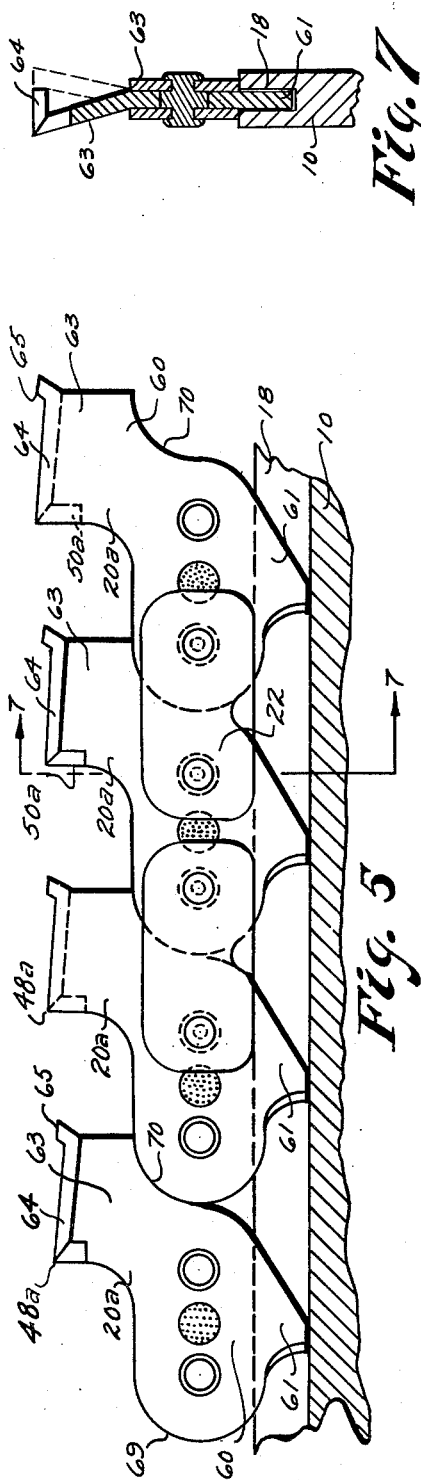
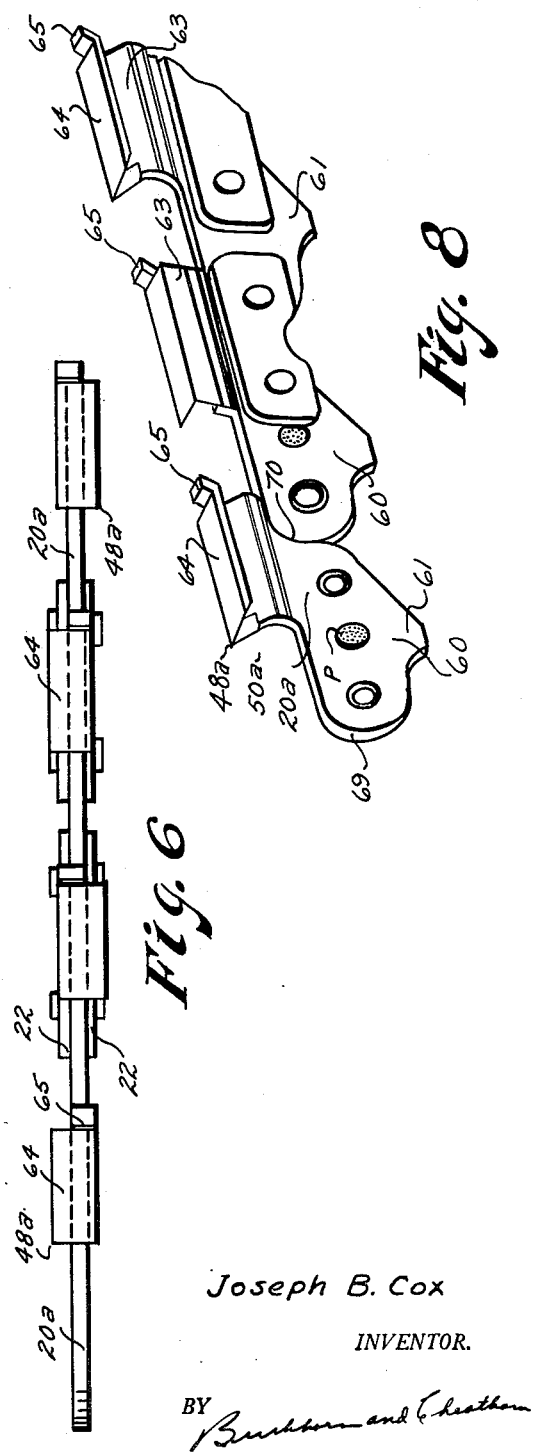
Joseph B. Cox
INVENTOR.
BY
Attorneys

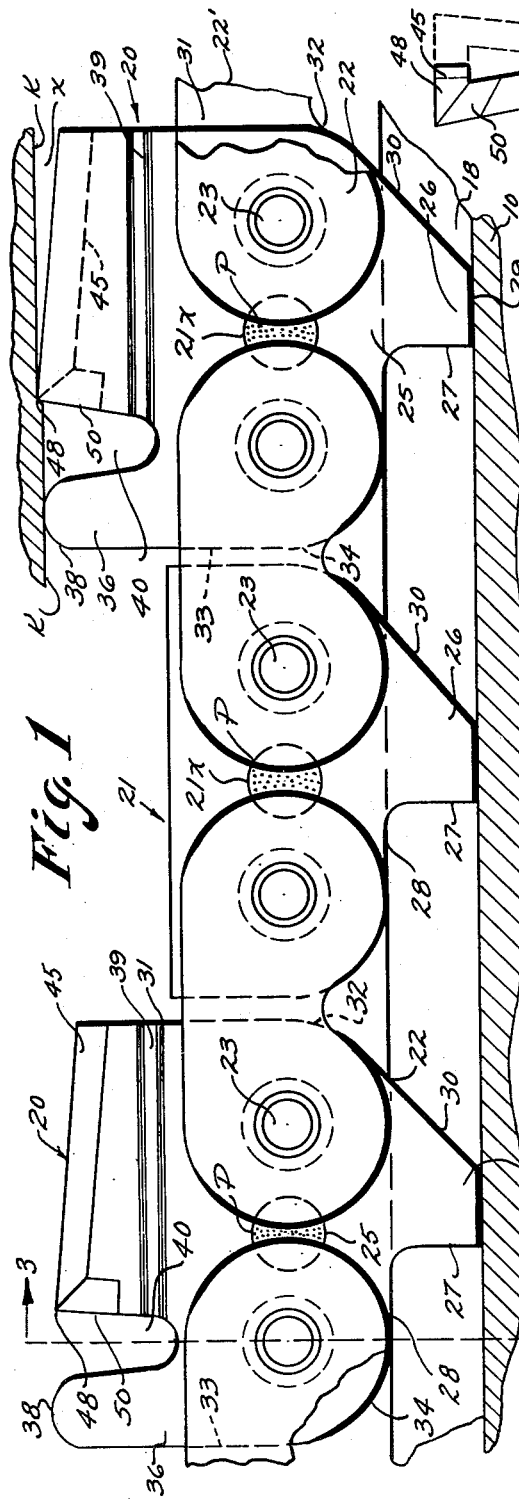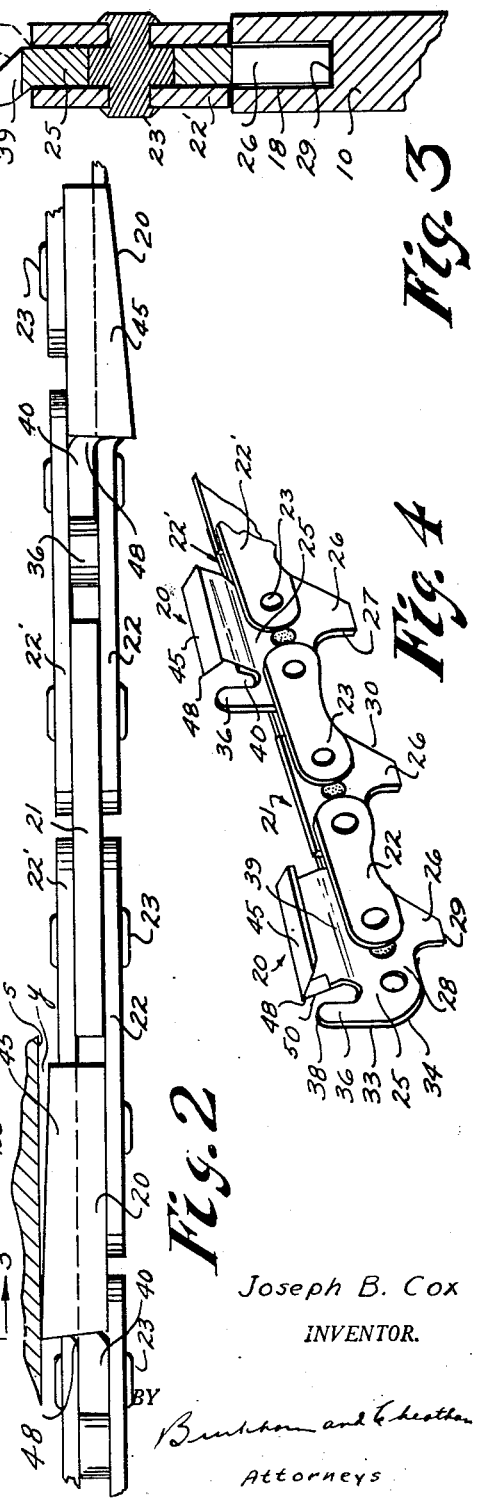
Joseph B. Cox
INVENTOR.

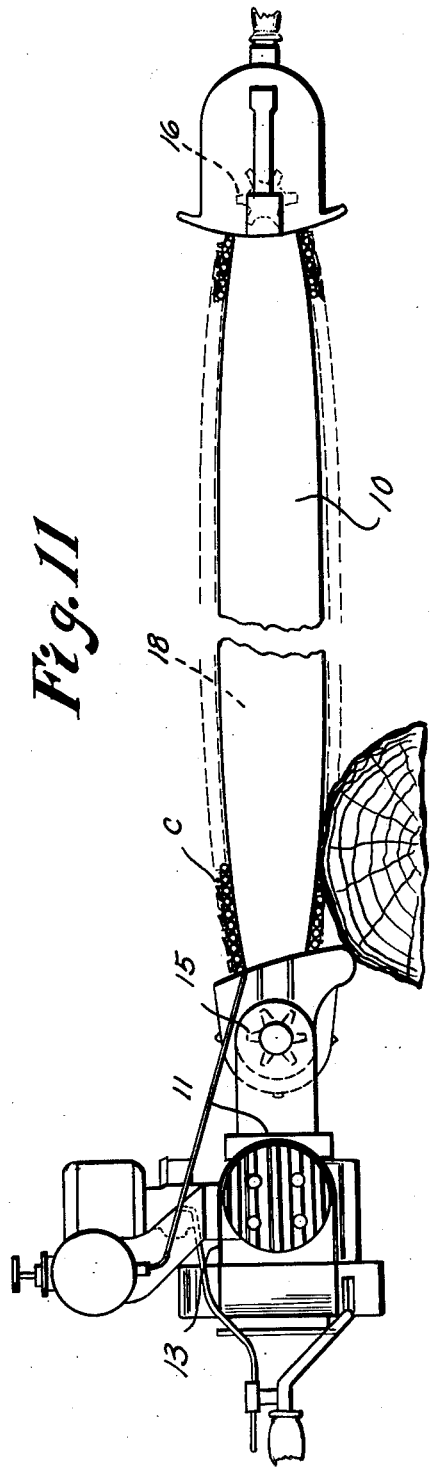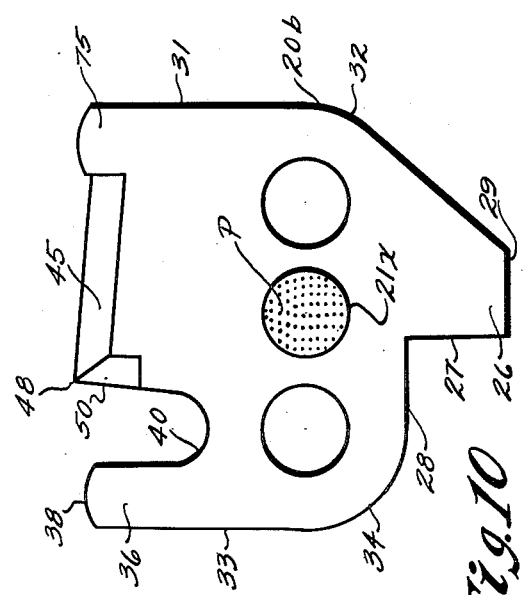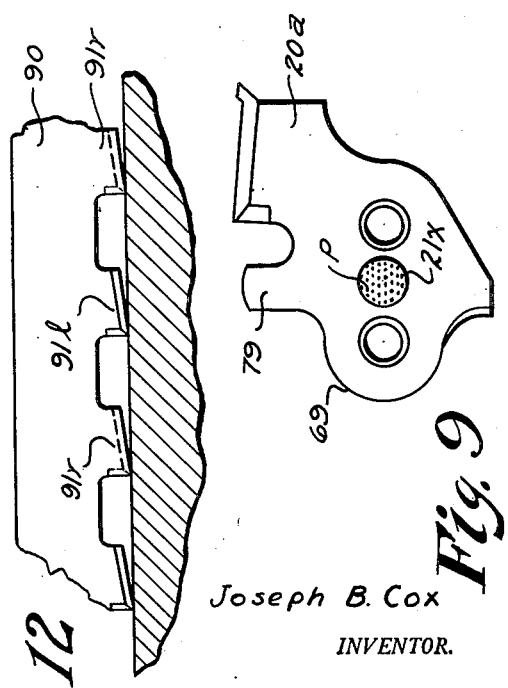

United States Patent Office 2,771,919
Patented Nov. 27, 1956

2,771,919

CHAIN SAWS

Joseph B. Cox, Portland, Oreg.

Original application July 1, 1946, Serial No. 680,549. Divided and this application October 8, 1951, Serial No. 250,282

3 Claims. (Cl. 143—135)

This invention relates to saws and it has reference more particularly to improvements in chain saws designed for cutting wood, such for example, saws that are power driven for the felling of trees and for those various other sawing operations that are common to the logging industry. Furthermore, the invention has to do with saws herein the chain belt which embodies the cutting elements in the links thereof, is mounted for one-way travel on a saw blade or bar that is grooved along its edges for the guided travel of the links of the saw chain thereon.

This application is a division of application Serial No. 680,549, filed July 1, 1946, now United States Letters Patent No. 2,622,636, issued December 23, 1952.

It is the principal object of this invention to provide certain improvements in chain saws of the kind above stated that will eliminate many of the difficulties and disadvantages that are now encountered in the use of, or which reside in many present-day types of chain saws and which are caused primarily by the cutter design and by reason of the fact that those cutters which form the sides of the kerf and the rakers or cutters which cut the kerf material free are separate from each other in the chain belt.

It is also an object of this invention to provide improvements in chain saw cutter links whereby easier, smoother and faster wood cutting may be accomplished without detrimental effect on the saw or to the material being cut and without requiring any increase in power for the operation or driving of the saw.

Still another object of this invention is to provide a chain saw wherein the cutting portions of the cutter links are so arranged as to provide friction free side clearance for the chain in its travel in the kerf, thereby reducing wear on the chain, bringing about easier operation and easier guiding of the saw and eliminating binding and jumping of the chain.

Still another object of the invention is to provide the cuter links wtih depth gauging means to insure smooth cutting and the elimination of vibration or irregular action of the chain belt.

Another prime object of this invention is to provide a chain saw embodying the various features above stated and wherein the better cutting action and various advantages attained thereby are due to the improvements made in the cutting portions of the chain links and wherein said improvements reside mainly in the provision of cutters that combine therein both the functions of side cutters and rakers. Furthermore, a chain saw wherein alternate cutting links are "right hand" and "left hand" and each operates to cut one side of the kerf and to cut the kerf material from between the side cuts, leaving a smoothly cut channel in which the chain operates freely and without binding.

Still another object of the invention is to provide a saw chain wherein successive links therein have a supporting relationship that results in an operating reaction between adjacent links of the chain that eliminates undesirable chain jumping that is common in many types of chain saws, and which is due to binding, gouging that increases with dullness of the cutters or looseness of the chain.

Another object of the invention is to provide a chain link embodying cutters that function both as side cutters and as rakers and whereby the arrangement is such that the operation of filing and sharpening is simplified.

Other objects and advantages of the present invention are to be found in the details of construction and combination of parts of the saw and in the cutter links as hereinafter described and illustrated in the accompanying drawings.

In accomplishing these and other objects of the invention, I have provided the improved details of construction, the preferred forms of which are illustrated in the accompanying drawings, wherein:

Fig. 1 is a side view of a section of a chain saw embodied by the present invention, together with a sectional portion of a saw blade on which the chain is mounted for travel;

Fig. 2 is a top or edge view of the parts as shown in Fig. 1;

Fig. 3 is a cross-section, taken on the line 3—3 in Fig. 1;

Fig. 4 is a perspective view or a short section of chain showing a "right" and a "left" cutter link and a spacer link in their connected relationship;

Fig. 5 is a section of a saw chain of an alternative or modified form of construction, embodying the features of the present invention;

Fig. 6 is a top view of the parts shown in Fig. 5;

Fig. 7 is a cross-section taken on the line 7—7 in Fig. 5;

Fig. 8 is a perspective view of a section of saw chain as shown in Fig. 5;

Fig. 9 is a side view of a cutter link of a modified form for use in chains as illustrated in Fig. 5;

Fig. 10 is a cutter link of alternative form for use in chains of the kind shown in Fig. 1;

Fig. 11 is a side view of a chain saw of a type for which the present improvements are adapted for use; and Fig. 12 is a view showing the present type of cutting teeth applied to a cross-cut saw.

Referring more in detail to the drawings:

In Fig. 11, for purpose of better understanding of the present improvements as applied to chain saws, I have shown one type of saw for which the improved chain is especially adapted. In this view, 10 designates the saw bar or blade and 11 designates a frame to which one end of the bar is suitably fixed for the intended use of the saw. Supported by the frame is an engine of suitable kind, designated in general by numeral 13, and this operatees through suitable power transmission devices, not shown, to rotatably drive a sprocket wheel 15 located adjacent the inner end of the bar over which the saw chain operates. At the outer end of the bar there is mounted a similar sprocket wheel 16, or other suitable chain guiding means about which the outer end of the chain belt may travel. The cutter chain belt is continuous and is designated generally in Fig. 11 by reference character C, wherein it is shown as extending about the sprocket wheels 15 and 16 and along opposite edges of the blade or bar 10, which, as shown in Figs. 3 and 7, is formed along its longitudinal edges with deep grooves 18 in which parts of certain of the chain links ride to functionally guide the chain in its use.

Referring now more particularly to that present preferred design of saw chain which has been illustrated in Figs. 1 to 4, inclusive, this chain belt comprises the alternately arranged cutter links 20 and spacer links 21, the spacer links 21 being pivotally joined at their ends with the outer links by the paired opposite side links 22—22'. Rivets 23 extend through the opposite end portions of the paired links and through the cutter and spacer links to effect the necessary and desired pivotal connection of the links embodied in the chain. The chain belt, as seen in Fig. 1, comprises, in succession, a "right hand cutter" link, a "spacer" link, and a "left hand cutter" link, these links of course being joined in succession by the paired side links 22 and 22' and rivets 23.

The cutter links, herein designated generally by numeral 20, and which are made as "right hand" and "left hand" cutters, are exactly alike in construction and in detail except that they are faced toward opposite sides of the chain, so that those faced in one direction will cut one side of the kerf and those faced in the other direction will cut the other side. All cutter links, however, operate also as rakers to remove the kerf to the depth and to the width defined by the coaction of the cutters. Therefore, the following description of a cutter link 20 will be understood to apply equally to the "right hand" and "left hand" units, and in the description, the terms "upper", "lower" and "ends" will have reference to the links as shown in Figs. 1 and 5 which show the section of chain operating along the top of the blade or bar.

Referring now more particularly to Figs. 1 and 4:

Each of the cutter links 20, as therein shown, comprises a flat metal blank 25, substantially of rectangular outline and formed medially of its base edge portion, with a rigid, downwardly extending guide wing 26. This wing lies in the same plane as the main body portion of the blank and is designed for guided travel in the edge grooves 18 of the saw blade or bar 10, as shown in Figs. 1 and 3. The forward edge 27 of this wing portion is perpendicular to the base edge 28 of the body of the link, its lower edge 29 is square cut and its back edge 30 slopes upwardly therefrom and merges into the trailing edge 31 of the body portion of the blank in a rounded corner, as at 32. Likewise, the base edge 28 of the blank merges into the forward edge 33 in a rounded corner, as shown at 34. The rounding of these corner portions is for the purpose of facilitating easier travel.

At the top edge of each body blank 25 and adjacent the forward end thereof, is a depth gauge portion 36, formed with an upwardly and rearwardly rounded top edge surface 38 for engaging in riding contact with the base or bottom surface of the kerf for the purpose of regulating the depth of cut, as will presently be understood. Just rearward of this depth gauge portion 36, the blank is recessed, as at 40, to provide clearance for material being cut out from the base of the kerf. The recess is relatively deep, as understood by reference to Fig. 1, and the depth gauge portion lies in the same plane as the main body portion of the blank. That upper portion of each blank that is rearward of the recess 40 is offset laterally from the plane of the blank to about the thickness of the blank, the offset being mainly in that portion of the link designated at 39 in Figs. 3 and 4, and from this rather abrupt offset portion, the metal extends upwardly and outwardly at approximately a 10 degree incline.

The "right hand" and "left hand" links are distinguished one from the other by one having the upper body portion offset to the left of the plane of the blank and the other having it offset to the right of the plane of the blank.

Formed along the top edge of each body blank and extending from the rearward edge of the blank to the recess 40, is a cutter flange 45. This comprises a laterally bent or formed longitudinal edge portion of the body blank, substantially rectangular in plan as seen in Fig. 2, and it extends along the link in a plane that is perpendicular to the plane of the main portion of the blank. The forward edge of the flanged portion is transverse to the line of travel of the chain and is beveled and sharpened to present a planing or cutting edge, as shown at 48. In the longitudinal direction of the link, the top or base surface of the flange 45 slopes slightly downward from the sharpened edge 48, that is, it slopes away from the base of the kerf that would be formed as the cutter advances. Also, as shown in Fig. 3, that vertical and forwardly facing edge portion of the laterally inclined portion of the blank that is even with the cutting edge 48, is beveled inwardly and is sharpened as at 50, and this sharpened edge is designed to form the cut that defines the side of the kerf. The sharpened angle that is formed by the merging of the cutting edges 48 and 50 forms the lower corner cut of the kerf as the link advances. Furthermore, it is shown in Fig. 1 that the planing edge 48 is slightly above the line of the rounded surface of the gauge portion and therefore as the link advances in making a cut, this edge 48 operates to plane or cut loose the kerf that is defined between the side cuts formed by the advancement of the right hand and left hand cutter links.

Another feature of this particular link construction resides in the fact that the transverse cutting edge 48 is slightly angularly inclined relative to the line of travel and also the outside face of the offset portion of the link is slightly inclined relative to the line of travel so as to provide clearance along the trailing portion of the link back of the cutting edge 50. This clearance, together with the provision of clearance between the top surface of the cutter flange 45 and base of the kerf, will insure the easy travel of the chain without binding. Furthermore, the width of the kerf as defined between the corner lines cut by right hand and left hand cutter, is slightly more than the length of the cutting edges 48 and therefore there will be no binding of the cutter flange 45 as it advances in the cut.

For better understanding, I have indicated in Fig. 1 the bottom surface of the kerf at K and in Fig. 2 I have indicated the side cut of the kerf at S and in Fig. 1 the clearance between the cutter flange and bottom of the kerf is shown at $x$ and in Fig. 2 the clearance between the offset portion and side wall is shown at $y$.

The cutter links 20 alternate with the spacer links 21 and are joined thereto by the paired side links 22—22' and these latter links are of such height that they may lie flatly against the lower body portions of the cutter link blanks below the offset portions 38. The laterally offset cutter forming portions of the links 20 and the depth gauge portions 36 thereof are above the line of the top edges of the side links. All the pivotal connections between links are aligned in an alinement parallel with the cutting edge, as shown in Fig. 1, and the lower edge portions of the paired links are designed to ride on the edge of the bar or blade 10 at opposite sides of the groove 18 in order to support the chain in an upright position with substantial rigidity and to support the guide wing portions of the links from riding at their lower ends in contact with the base of the bar groove.

While I have shown the saw chain in Fig. 1 as embodying the spacer links 21 between the "right" and "left" cutter links, these spacer links might be eliminated if so desired and the right and left cutter links connected end to end by the paired links 22. This is a matter of use or desires.

A feature of construction to aid in lubricating the chain, and which may be used or omitted if not desired, resides in the forming of the body of the spacer links 21 with holes 21x in which felt pads p are fitted to carry the lubricant.

In an alternative form of chain, shown in Figs. 5, 6 and 7, other links 20a are placed end to end, alternately being formed as "right hand" and "left hand" cutters. These are joined pivotally by paired side links 22 in the same manner as the main links of the chain of Fig. 1 are joined.

Each cutter link 20a comprises a body blank 60, formed medially of its lower edge, with a depending guide wing portion 61, designed to travel in the groove 18 of the saw blade or bar 10. At the rearward end of the blank is an upwardly directed portion 63, laterally inclined from the body portion, as shown in Fig. 7, and this inclined portion is formed at its top edge with a laterally extending blade or cutter portion 64, corresponding to the part 45 of the link 20 of Fig. 3. The forward edge of this cutter portion is sharpened as at 48A and also the forward edge of the offset portion is sharpened as at 50A, to define a combined cutter and raker tooth. The junction of these cutting edges likewise serves to cut the corner of the base of the kerf and the sharpened edge 48A removes the kerf to the extent of the depth of the cut between right and left cutter. It is also shown in Fig. 5 that at the rear end portion of the cutter flange 64 there is an upwardly directed toe 65 that serves as a guide portion for the link. This rides against the bottom of the kerf.

In this design of link, the forward end of each link is rounded about the center of the pivotal connection 23 with the side links and the rearward end of each link has a similarly rounded seat 70, designed to receive therein the rounded forward end portion of the next following link. This permits the necessary pivotal action for the chain passing around the sprocket wheels and prevents the undesirable gouging and jumping of the chain in operation, due to the fact that each link serves as a supporting element for the rearward portion of the next forward link.

As a modification of the cutter link shown in the saw chain of Fig. 4, links as in Fig. 10 might be used. Each of these links 20b is formed with a depth gauge portion 75 at its rear end extended to the level of the gauge portion 36, and the cutter flange 45 shortened accordingly.

Also, links as used in the chain of Fig. 5 might be modified as shown in Fig. 9 wherein the link blank is equipped with a depth gauge portion 79 forwardly of the cutter portion.

While I have described the improvements as applied to chain saws, it is anticipated also that ordinary cross-cut saws might be equipped with teeth of the kind disclosed. Therefore, I have on Fig. 12 shown a fragmental portion of a cross-cut saw blade 90 equipped with right and left cutters at 91r and 91h. These are like the cutters previously described insofar as angle inclination and cutting edges are concerned. The spacing is such as to be practical and the depth gauging elements used in the chain saw are eliminated.

Assuming saws to be so constructed, it is apparent that the cutting edges of the right-hand and left-hand cutter links will coact to form a kerf of a width determined by the lateral offsetting of the cutter portions. Also, that the material of the kerf will be planed out from between the side cuts by the transberse edges of the parts 45. The inclining of the cutter surfaces back of the cutting edges relieves the chain of all binding tendencies and makes guiding of the saw easy. Sharpening of cutters may be easily accomplished and both side and cross cutting edges may be sharpened in one operation.

Having thus described my invention, what I claim as new therein and desire to secure by Letters Patent is:

1. In a saw chain consisting of a plurality of alternating right and left cutter links, spacer links pivotally connecting adjacent cutter links, each of said cutter links consisting of a flat body having an integral depth gauge tooth extending outwardly from the forward end thereof and coplanar with said body and an integral cutter tooth spaced from said depth gauge tooth by a relatively deep sawdust recess, said cutter tooth consisting of a side wall portion and an outer flange portion, said portions being integral with said body and extending from said recess to the opposite end of said cutter link, said side wall portion being laterally offset throughout its length with respect to the plane of said body by a progressively decreasing amount from the forward edge to the rear edge thereof whereby said side wall portion is inclined throughout its height with respect to the plane of said body in the longitudinal direction thereof, said flange portion extending substantially at right angles to the plane of said body, the foremost edges of said side wall and flange portions being sharpened, said alternating cutter links being identical to each other except of right and left configuration, said flange portions of alternate cutter teeth extending in opposite directions across the median plane of said body, and a second depth gauge defining portion at the rear end of said cutter links.

2. In a saw chain consisting of a plurality of alternating right and left cutter links, spacer links pivotally connecting adjacent cutter links, each of said cutter links consisting of a flat body having a cutter tooth consisting of a side wall portion and an outer flange portion, said portions being integral with said body, said side wall portion being laterally offset throughout its length with respect to the plane of said body by a progressively decreasing amount from the forward edge to the rear edge thereof whereby said side wall portion is inclined throughout its height with respect to the plane of said body in the longitudinal direction thereof, said flange portion extending substantially at right angles to the plane of said body, the foremost edges of said side wall and flange portions being sharpened, a depth gauge portion at the rear end of said flange portion and extending outwardly beyond the outer surface of the adjacent flange portion, said alternating cutter links being identical to each other other than being of right and left configuration, said flange portions of alternate cutter teeth extending in opposite directions across the median plane of said body.

3. A chain for a chain saw comprising successive groups of separately formed link members pivotally joined and overlapped in tandem formation to permit driving of the same when looped around a pair of sprockets, means on said chain cooperating with a guide blade provided on said saw for guiding said chain in a true cutting plane, a pair of cutting links in each of said groups, said cutting links being spaced longitudinally along said chain and provided with alternate right and left-hand cutting teeth, and an integrally formed leading and trailing depth gauge on each of said cutting links.

References Cited in the file of this patent
UNITED STATES PATENTS

| | | |
|---|---|---|
| 2,534,591 | Geurian | Dec. 19, 1950 |
| 2,558,678 | Garrett | June 26, 1951 |